Figure 1:
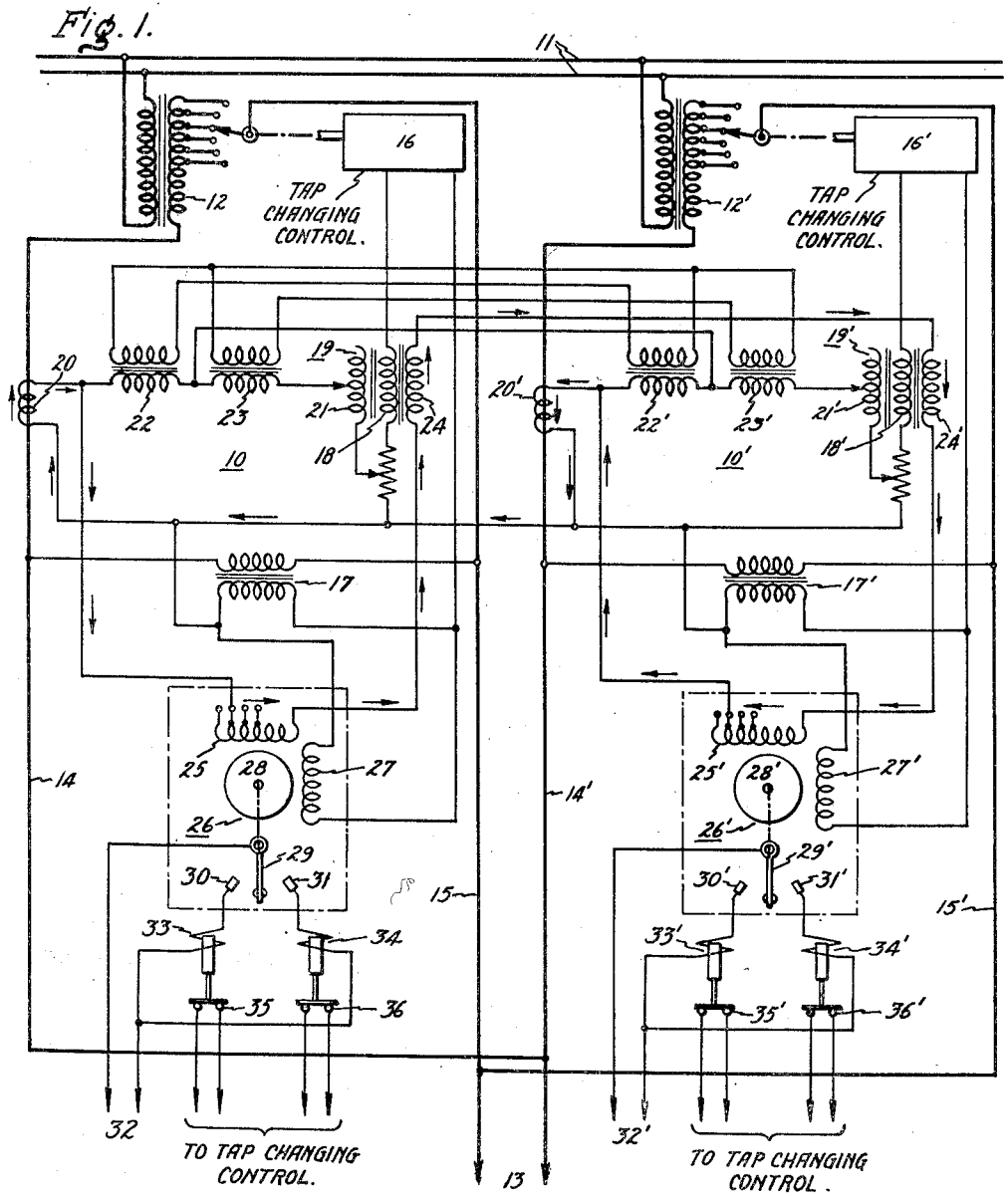

Feb. 5, 1957 S. MINNECI 2,780,735
AUTOMATIC PARALLEL OPERATION OF TRANSFORMERS
Filed Jan. 21, 1955

Inventor
Salvatore Minneci,
by Gilbert P. Tarleton
His Attorney.

United States Patent Office 2,780,735
Patented Feb. 5, 1957

2,780,735

AUTOMATIC PARALLEL OPERATION OF TRANSFORMERS

Salvatore Minneci, Pittsfield, Mass., assignor to General Electric Company, a corporation of New York Application January 21, 1955, Serial No. 483,247

15 Claims. (Cl. 307—83)

This invention relates to automatic parallel operation of alternating current power supply circuits, and more in particular to directional lockout protection for parallel operation of voltage regulating transformer systems or other voltage regulating systems.

When a number of automatically controlled voltage regulating transformers such as load tap changing transformers are parallel connected, circulating currents often flow in the circuit due to unequal secondary voltages of the transformers. These circulating currents do no useful work, and cause wasteful losses in the system. Various paralleling circuits have been proposed for correcting this condition automatically to reduce or eliminate the circulating currents. Typical circuits of this type are disclosed in U. S. Patent 2,322,249 issued on June 22, 1943, on an application of S. Minneci and assigned to the present assignee and also in U. S. Patent 2,323,716 issued on July 6, 1943, on an application of T. C. Lennox and also assigned to the present assignee.

In a typical load tap changing transformer circuit, a voltage proportional to the secondary voltage of each transformer is obtained by means of a potential transformer connected across each load tap changing transformer output. A voltage regulating relay connected to the secondary winding of the potential transformer responds to changes in the output voltage of the tap changing transformer to actuate a tap changing motor to make a corrective change in the taps of the secondary of the load tap changing transformer.

To hold the voltage constant at the load, a line drop compensator is added to each transformer control circuit. A current proportional to the line current of each transformer is passed through an adjustable impedance which is connected to the voltage regulating relay. The voltage drop in the impedance is proportional to the line voltage drop, and the tap changing motor thus makes tap changes to hold the load voltage constant. In order to prevent the line drop compensator from being sensitive to circulating current and thereby causing erroneous tap changes, various means are provided for separating the load currents and circulating currents, and permitting only the load current to pass through the line drop compensator. In one method, a load current transformer is connected in series with each line drop compensator reactor, and by connecting the secondaries of all of the load current transformers in series the circuit offers a high impedance to circulating current. The circulating current component may be bypassed to flow through another reactor connected to the line drop compensator, and by proper connection of these reactors, the tap changing motor will act to minimize the circulating currents.

In order to save transformer losses during light load periods, one or more of the load tap changing transformers are sometimes removed from service, and the full load current must thereby be supplied by the remaining transformers. In order to prevent erroneous line drop compensation from occurring due to such changes in load current, a compensating current transformer may be placed in series with each load current transformer, the secondary windings of the compensating current transformers being connected in series, and a connection made between the junctions of the load current and compensating current transformers. This arrangement forces proper division of current through the line drop compensators.

In such circuits it is advisable to provide protection against excessive circulating current. In the past, overcurrent relays have been connected in series with the circuits through which only the circulating current component passes. Upon the occurrence of a condition causing excessive circulating current, the overcurrent relay contacts lock out the controls of all transformers, and thereby prevent further operation of the tap changers in either direction until the cause of lock-out is investigated and the controls restored manually to normal operation. This arrangement has been found to be unsatisfactory, however, because certain momentary severe voltage disturbances in the system cause unnecessary lock-out of the controls. This difficulty has been overcome in some instances by the addition of relays and control interconnections between the transformers to prevent such momentary disturbances from locking-out the controls. Such additional relays and interconnections in the past have complicated the control system and are therefore very undesirable, and they do not correct for the effect of intermittent shock.

For example, in the operation of two transformers in parallel, possible differences in time of closing of contacts or time delay relays may cause several tap changes to be made on one unit before the other unit has changed at all. This may give rise to excessive circulating currents. In past systems, unless complicated circuits were used, the entire system would be locked-out, and require manual resetting.

These difficulties have been overcome in the present invention by employing a directional current device operative upon the occurrence of excessive circulating current in the transformer circuits, to lock-out the controls of the transformers only insofar as tap changes tending to increase the excessive current condition are concerned. This system requires a minimum of components, and enables the system to return to its normal operating position automatically upon removal of the abnormal condition, and upon removal of the excess circulating currents, to automatically disengage the lock-out. Briefly stated, in one embodiment of the invention, a circulating current component in the control system circuit is directed through the current winding of an induction disc relay and a substantially constant voltage which may be derived from the output of the tap changing transformer is impressed across the voltage winding of the relay. When excessive circulating currents flow in the system, contacts on the relay act to lock-out the tap changing control unit from making tap changes that increase the excessive condition. The circuit is connected such that tap changes in the opposite direction are not prevented, and upon removal of the excessive currents the lock-out is disengaged.

It is, therefore, an object of this invention to provide improved directional lock-out protection with a minimum of circuit components for a load tap changing paralleling system.

It is also an object of this invention to provide directional lock-out protection for a load tap changing paralleling system whereby further tap changes tending to increase an excessive circulating current condition of a predetermined value are prevented without preventing tap changes in the opposite direction, and including means for automatically disengaging the lock-out upon correction of the excessive current condition.

My invention will be better understood from the following description taken in connection with the accompanying drawing and its scope will be pointed out in the appended claims.

Figure 2:
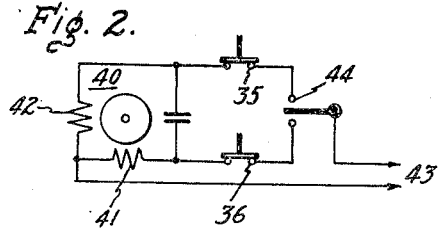

In the drawing Fig. 1 is a circuit diagram of one embodiment of my invention as applied to a typical system for paralleling load tap changing transformers, and Fig. 2 is a circuit diagram of a portion of the tap changing control unit of Fig. 1 and illustrating a typical method of controlling the tap changing motor drive.

Referring now to the drawing, I show therein a load tap changing system comprising two power circuits 10 and 10'. Since these circuits are substantially identical, in order to reduce confusion, the same reference numerals will be used to denote similar elements in the two circuits, the elements of circuit 10' being distinguished by having prime marks associated therewith. Accordingly, where the circuits are identical, the detailed description will refer only to one of the circuits.

The two circuits are supplied by a common source of supply 11 across which are connected the primary windings of the load tap changing transformers 12 and 12'. The two circuits also have a common load 13 which is connected across the secondary windings of the load tap changing transformers in parallel by leads 14, 14', 15 and 15'. The leads 15 and 15' are connected to the tapped end of the load tap changing transformers, and the taps are changed by means of tap changing control units 16 and 16' of any suitable type, the control of which will be described in more detail in the following paragraphs.

A potential proportional to the output voltage of the load tap changing transformer is provided by means of potential transformer 17 which is connected across the leads 14 and 15. The secondary winding of the potential transformer is connected to the tap changing control unit 16 by way of winding 18 of the line drop compensator 19. Due to voltage sensitive means (e. g. voltage regulating relays) within the tap changing control unit, variation in output voltage of the transformer 12 from a predetermined value actuates the motor drive in the unit to select the proper tap for correct output voltage.

In order to compensate for line voltage drop and thus provide a constant load voltage, a current transformer 20, coupled to lead 14 and providing a current proportional to the load tap changing transformer current, is connected across the winding 21 of line drop compensator 19. Since it is desirable to allow only the load current component to flow through the winding 21, a load current transformer 22 is placed in series with the winding 21 and interconnected with the similar winding 21' in the manner disclosed in the above-mentioned Minneci and Lennox patents to present a low impedance for the flow of load currents, but a high impedance for the flow of the circulating current component. This effect is due to the reflection of circulating current in the secondary of the load current transformer, the reflected current being in such a direction as to oppose the flow of circulating current. Were means not provided for removing the circulating current from this circuit, erroneous tap changes would be made, since an increase in load current requires an increase in output potential in order to maintain a constant load voltage, whereas an increase in circulating current would normally be corrected by decreasing the secondary voltage of the load tap changing transformer.

When one or more paralleled load tap changing transformers are removed from service, the remaining transformers must carry the full load. This results in an increase in the load current, and unless means are provided for compensating for this condition, the additional current through the line drop compensator will cause an erroneous tap change to be made. In one method for removing this difficulty, a compensating current transformer 23 is placed in series with the load current transformer and connected in the manner disclosed in the above-mentioned Minneci patent. This arrangement forces the additional units of the load current component to be bypassed and not flow through the line drop compensator.

The circulating current component of the current transformer current 20 flows through third winding 24 of the line drop compensator 19, and this third winding 24 is interconnected with the similar winding 24' in such a manner that the tap changing control always tends to reduce circulating current. This type of connection is well known, and a modified form as illustrated by Minneci employs separate transformers for the same purpose.

The circulating current which flows through the third winding 24 of the line drop compensator 19 also flows through the current winding 25 of an alternating current induction disc relay 26. A typical relay of this type is comprised of a current winding 25, a potential winding 27, a spring balanced disc rotor 28, a switch arm 29 connected to the rotor, and contacts 30 and 31 disposed in the path of the switch arm 29. The rotor 28 is balanced so that the arm 29 is normally centered between the contacts. The operation of the relay is very similar to that of a conventional watt-hour meter. When a current is passed through current winding 25 and a voltage is impressed across the potential winding 27, the disc rotor 28 tends to rotate. The operation of these relays depends upon both the phase angle and magnitude of the applied current and voltage, and therefore the direction of rotation of the disc depends upon the phase angle between the current and voltage applied to the windings. Since the switch arm 29 is mechanically affixed to the disc, rotation of the disc causes the switch arm to make contact with either contact 30 or contact 31.

The potential winding 27 may be connected to the secondary winding of potential transformer 17, or it may be connected to any other substantially constant potential source having the same frequency and phase.

Sensitivity of the relay 26 may be varied by passing the circulating current through different taps on the current winding 25.

The switch arm 29 is connected to one line of a source of potential 32, and the other line of source of potential 32 is connected to the windings of relays 33 and 34. The other ends of the windings of relays 33 and 34 are connected to the induction disc relay contacts 30 and 31 respectively.

Relays 33 and 34 are provided with normally closed contacts 35 and 36 respectively. These contacts are connected by means of leads (not shown) to the tap changing control unit 16, and are connected so that the opening of contact 35 prevents the motor drive from increasing the secondary voltage of the load tap changing transformer, and opening of contact 36 prevents the motor drive from decreasing the secondary voltage of the load tap changing transformer.

In Fig. 2 is illustrated a typical circuit for controlling the tap changing motor. In this circuit, a reversible motor 40 having two windings 41 and 42 has the lead common to the two windings connected to a source of potential 43. The other ends of the two windings are connected respectively to the contacts 35 and 36. These contacts are the contacts of relays 33 and 34 respectively of Fig. 1. The contacts serve to break the line between the ends of the motor windings and the contacts 44 of a voltage regulating relay (not shown) in the tap changing control unit. This circuit merely illustrates one method of controlling a tap changing motor, and other well known circuits may also be used without departing from the scope of this invention.

In operation, the voltage supplied to the potential winding 27 is relatively constant, and the current supplied to current winding 25 is proportional to the circulating current in the parallel load tap changing transformer system. This circulating current lags the voltage of the transformer having the higher voltage, and leads the voltage of the other transformer. Due to the phase sensitive characteristics of the induction disc relay, the relay contacts act to prevent increasing of the load tap changing transformer voltage when circulating current lags the load voltage, and to prevent decreasing of the load tap changing transformer voltage when the circulating current leads the voltage. It is noted, however, that operation of the tap changing motor is prevented only in one direction, and that all lock-out is disabled when the circulating current is less than a predetermined value.

Now assuming that the voltage of load tap changing transformer 12 has increased in relation to the voltage of transformer 12′, a circulating current is caused to flow through transformers 12 and 12′. This causes a current proportional to the circulating currents to flow in the direction indicated by the arrows through current transformers 20 and 20′, circulating current windings 25 and 25′, and, windings 24 and 24′ of the line drop compensators. Since the voltage supplied to each of the two potential windings 27 and 27′ is in the same relative direction and the currents through the two current windings 25 and 25′ are in opposite directions, the two disc rotors tend to rotate in opposite directions. Thus when the voltage of load tap changing transformer 12 is higher than the voltage of load tap changing transformer 12′, disc 28 rotates in a clockwise direction establishing contact between switch arm 29 and contact 30, and disc 28′ rotates in a counterclockwise direction establishing contact between switch arm 29′ and contact 31′. The closing of contact 30 to switch arm 29 energizes relay 33, and thereby causes contacts 35 to be opened. Similarly, the closing of contact 31′ to switch arm 29′ energizes relay 34′ and causes contacts 36′ to be opened. By opening of contacts 35 and 36′, the motor drive for system 10 is prevented from making tap changes that increase the secondary voltage of load tap changing transformer 12, and the motor drive for system 10′ is prevented from making tap changes that decrease the secondary voltage of load tap changing transformer 12′. Since contacts 36 and 35′ remain closed, the motor drives may make tap changes in the opposite direction. Once the excessive currents have been removed, the switch arms 29 and 29′ return to a neutral position, thereby disengaging the lock-out.

As previously stated, the sensitivity of the lock-out may be varied by utilizing different taps on the current winding 25. Thus the lock-out may occur at any predetermined value of circulating current in the system. The spring tension on the disc rotor may also be varied for the same purpose.

The previously described circuit is merely one embodiment of this invention in conjunction with a typical load tap changing transformer system. Although the description relates primarily to load tap changing transformer systems, this invention may be used in conjunction with any voltage regulating system, for example induction voltage regulation systems, that provides means for making the proper connections thereto. Any substantially constant source of potential having the proper amplitude, frequency, and phase may be used to supply the potential windings 27 and 27′. Although the drawing and description apply only to the paralleling of two transformers, it is obvious that any number of transformers may be thus paralleled.

It will be understood, of course, that, while the form of the invention herein shown and described constitutes a preferred embodiment of the invention, it is not intended herein to illustrate all of the possible ramifications of the invention. It will also be understood that the words used are words of description rather than of limitation, and that various changes may be made without departing from the spirit and scope of the invention.

What I claim as new and desire to secure by Letters Patent of the United States is:

1. In a system for parallel operation of voltage regulating systems, a plurality of said systems having their load circuits connected in parallel, and directional current means controlled by current circulating between said systems for preventing increase of said circulating current beyond a predetermined maximum value while permitting decrease in said circulating current from said predetermined maximum value.

2. In a system for parallel operation of voltage regulating transformers, a plurality of said transformers having their load circuits connected in parallel, and directional current means controlled by current circulating between said transformers and preventing voltage changes on said transformers only in the direction that tends to increase said circulating current beyond a predetermined maximum value.

3. In a system for parallel operation of voltage regulating transformers, a plurality of said transformers having their load circuits connected in parallel, means for varying the output voltage of said transformers and directional current means controlled by circulating current in said system, said directional current means having contacts operative to prevent said voltage varying means from increasing the load voltage of any of said transformers only when circulating current greater than a predetermined maximum value flows in said transformer and lags said load voltage, and to prevent said voltage varying means from decreasing said load voltage only when circulating current greater than said predetermined maximum value flows in said transformer and leads said load voltage.

4. In a system for parallel operation of voltage regulating transformers, a first voltage regulating transformer having its load windings connected in parallel with the load windings of at least one other voltage regulating transformer, means for varying the output voltage of said transformers, directional current means controlled by circulating current flowing through said first transformer, first contact means on said directional current means operative when said circulating current is greater than a predetermined maximum value and has a phase lagging relation to the load voltage of said transformer, second contact means on said directional current means operative when said circulating current is greater than a predetermined maximum value and has a phase leading relation to said load voltage, said first contact means connected to prevent said voltage varying means from increasing said load voltage only upon the occurrence of said lagging circulating current exceeding said predetermined maximum value, and said second contact means connected to prevent said voltage varying means from decreasing said load voltage only upon the occurrence of said leading circulating current exceeding said predetermined maximum value.

5. In a system for parallel operation of voltage regulating transformers, means for inhibiting transformer load voltage changes that increase circulating current beyond a predetermined maximum value while permitting said load voltage changes that tend to decrease said circulating current from said predetermined maximum value, said means comprising directional current means controlled by said circulating current, and a plurality of electrical contacts on said directional current means, said contacts being adapted to selectively interrupt load voltage changing means on said transformers when said circulating current exceeds said predetermined maximum value.

6. In a system for parallel operation of voltage regulating transformers, means for inhibiting transformer load voltage changes that increase circulating current beyond a predetermined maximum value while permitting said load voltage changes that tend to decrease said circulating current from said predetermined value, said means comprising directional current means controlled by said circulating current, means supplying a reference potential to said directional current means, and a plurality of electrical contacts on said directional current means, said contacts being adapted to selectively interrupt load voltage changing means of said transformers when said circulating current exceeds said maximum value.

7. In a system for parallel operation of voltage regulating transformers, means for inhibiting transformer load voltage changes that increase circulating current beyond a predetermined maximum value while permitting said load voltage changes that tend to decrease said circulating current from said predetermined maximum value, said means comprising means obtaining a current proportional to the circulating current of said system, a source of a reference potential, directional current means controlled by said proportional current and said reference voltage, and a plurality of electrical contacts on said directional current means, said contacts being adapted to selectively interrupt load voltage changing means on said transformers when said circulating current exceeds said predetermined maximum value.

8. In a system for parallel operation of voltage regulating transformers, means for inhibiting transformer load voltage changes that increase circulating current beyond a predetermined maximum value while permitting said load voltage changes that tend to decrease said circulating current from said predetermined maximum value, said means comprising means obtaining a current proportional to said circulating current of said system, a source of reference potential, a directional current relay having a current winding and a potential winding, means connecting said proportional current obtaining means to said current winding and said reference potential source to said potential winding, and a plurality of electrical contacts on said directional current means, said contacts being adapted to selectively interrupt load voltage changing means on said transformers when said circulating current exceeds said maximum value.

9. The system of claim 6 wherein said directional current relay is an alternating current induction disc type relay.

10. In a system for parallel operation of voltage regulating transformers, means for inhibiting transformer load voltage changes that increase circulating current in said system beyond a predetermined maximum value while permitting said load voltage changes that tend to decrease said circulating current from said predetermined maximum value, said means comprising means obtaining a current proportional to the circulating current of said system, a source of reference potential, a directional current relay having a current winding and a potential winding, means connecting said proportional current obtaining means to said current winding and said reference potential source to said potential winding, said relay having first electrical contacts operative when said circulating current lags the load voltage of one of said transformers to prevent load voltage changing means on said one transformer from increasing the load voltage of said one transformer, and when said circulating current leads the load voltage of said one transformer to prevent said load voltage changing means from decreasing the load voltage of said one transformer.

11. In a system for parallel operation of alternating current power supply systems, means for decreasing circulating current in said systems and inhibiting changes in load voltage of said systems that increase said circulating current beyond a predetermined maximum value while permitting said load voltage changes that decrease said circulating current from said predetermined maximum value, said means comprising means obtaining a current proportional to the circulating current of each of said systems, continuously acting means in each system actuated by said proportional current for changing said load voltage of the respective system to reduce said circulating current, means supplying a reference potential to said directional current means, and a plurality of electrical contacts on said directional current means, said contacts being adapted to selectively interrupt load voltage changing means of said systems when said circulating current exceeds said maximum value.

12. In a system for parallel operation of alternating current power supply systems, means for decreasing circulating current in said systems and inhibiting changes in load voltage of said systems that increase said circulating current beyond a predetermined maximum value while permitting said load voltage changes that decrease said circulating current from said predetermined maximum value, said means comprising means obtaining a current proportional to the circulating current of each of said systems, continuously acting means in each system actuated by said proportional current for changing said load voltage of the respective system to reduce circulating current, a source of reference potential, directional current means controlled by said proportional current and said reference potential, and a plurality of electrical contacts on said directional current means, said contacts being adapted to selectively interrupt load voltage changing means in said systems when said circulating current exceeds said predetermined maximum value.

13. In a system for parallel operation of alternating current power supply systems, means for decreasing circulating current in said systems and inhibiting changes in load voltage of said systems that increase said circulating current beyond a predetermined maximum value while permitting said load voltage changes that decrease said circulating current, said means comprising means obtaining a current proportional to the circulating current of each of said systems, continuously acting means in each system actuated by said proportional current for changing said load voltage of the respective system to reduce circulating current, a source of reference potential, a directional current relay having a current winding and a potential winding, means connecting said proportional current obtaining means to said current winding and said reference potential source to said potential winding, and a plurality of electrical contacts on said electrical current means, said contacts being adapted to selectively interrupt load voltage changing means in said systems when said circulating current exceeds said maximum value.

14. In a system for parallel operation of alternating current power supply systems, means for decreasing circulating current in said systems and inhibiting changes in load voltage of said systems that increase said circulating current beyond a predetermined maximum value while permitting said load voltage changes that decrease said circulating current, said means comprising means obtaining a current proportional to the circulating current of each of said systems, continuously acting means in each system actuated by said proportional current for changing said load voltage of the respective system to reduce circulating current, a source of reference potential, a directional current relay having a current winding and a potential winding, means connecting said proportional current obtaining means to said current winding and said reference potential source to said potential winding, said relay having first electrical contacts operative when said circulating current lags the load voltage of one of said systems to prevent load voltage changing means in said one system from increasing the load voltage of said one system, and when said circulating current leads the load voltage of said one system to prevent said load voltage changing means from decreasing the load voltage of said one system.

15. In a system for parallel operation of alternating current power supply systems, means for decreasing circulating current in said systems and inhibiting changes in load voltage of said systems that increase said circulating current beyond a predetermined maximum value while permitting said load voltage changes that decrease said circulating current, said means comprising means obtaining a current proportional to the circulating current of each of said systems, separate means for changing the load voltage of each of said systems, continuously acting means in each of said systems actuated by said respective proportional current for changing said load voltage of the respective system to reduce circulating current in the respective system, a source of reference potential, a directional current relay in each of said systems and having a current winding and a potential winding, means connecting the proportional current obtaining means of each of said systems to the respective current winding and said reference potential source to the potential winding of each of said relays, said relays each having first electrical contacts operative when the circulating current lags the load voltage of the respective system to prevent the load voltage changing means of said respective system from increasing the load voltage of said respective system and when circulating current leads the voltage of its respective system to prevent said load voltage changing means of said respective system from decreasing the load voltage of said respective system.

References Cited in the file of this patent

UNITED STATES PATENTS

| | | |
|---|---|---|
| 1,626,451 | Chaplin | Apr. 26, 1927 |
| 2,323,716 | Lennox | July 6, 1943 |